US006744509B2

(12) United States Patent
Davis et al.

(10) Patent No.: US 6,744,509 B2
(45) Date of Patent: Jun. 1, 2004

(54) RETARDANCE SWEEP POLARIMETER AND METHOD

(75) Inventors: Scott R. Davis, Denver, CO (US); Radoslaw J. Uberna, Boulder, CO (US); Richard A. Herke, Antioch, CA (US)

(73) Assignee: Meadowlark Optics, Inc., Frederick, CO (US)

( * ) Notice: Subject to any disclaimer, the term of this patent is extended or adjusted under 35 U.S.C. 154(b) by 0 days.

(21) Appl. No.: 10/224,041

(22) Filed: Aug. 20, 2002

(65) Prior Publication Data

US 2004/0036876 A1 Feb. 26, 2004

(51) Int. Cl.[7] .................................................. G01J 4/00
(52) U.S. Cl. ...................................................... 356/367
(58) Field of Search ................................. 356/364, 365, 356/367, 368, 369, 370, 366; 250/225

(56) References Cited

U.S. PATENT DOCUMENTS

| | | | |
|---|---|---|---|
| 4,306,809 A | 12/1981 | Azzam | |
| 5,081,348 A | 1/1992 | Siddiqui | |
| 5,247,176 A | 9/1993 | Goldstein | |
| 5,521,705 A | 5/1996 | Oldenbourg et al. | |
| 5,706,212 A | * 1/1998 | Thompson et al. | ........... 702/85 |
| 6,043,887 A | 3/2000 | Allard et al. | |
| 6,177,995 B1 | 1/2001 | Compain et al. | |
| 6,211,957 B1 | 4/2001 | Erdogan et al. | |
| 6,268,915 B1 | 7/2001 | Abraham et al. | |
| 6,501,548 B1 | 12/2002 | Oldenbourg | |
| 2001/0038729 A1 | 11/2001 | Westbrook | |
| 2002/0044282 A1 | 4/2002 | Moeller et al. | |

OTHER PUBLICATIONS

Daniels, Optimum Design of a Polarimeter for Visible Light, Aug. 1986, Rev. Sci. Instrum., vol. 57, No. 8, pp 1570–1573.
Azzam, Arrangement of Four Photodetectors for Measuring the State of Polarization of Light, Jul. 1985, Optics Letters, vol. 10, No. 7, pp309–311.
Skumanich et al, The Calibration of the Advanced Strokes Polarimeter, Jun. 1997, The Astrophysical Journal Supplement Series, vol. 110, pp 357–359.
Meadowlark Optics, Strokes Polarimetry using Liquid–Crystal Variable Retarders, 1999, Meadowlark Optics Catalog and Web Site, www.meadowlark.com/AppNotes/appnote3.htm.
Baur et al, A Spectrum Scanning Stokes Polarimeter, 1980, vol. 65, pp 111–146.

(List continued on next page.)

*Primary Examiner*—Michael P. Stafira
(74) *Attorney, Agent, or Firm*—Michael Pritzkau; Yoriko Morita

(57) ABSTRACT

In a polarimeter for analyzing a state of polarization of a light beam incident thereon, the polarimeter including first and second variable retarders configured to exhibit first and second retardance values, respectively, variable over an overall retardance range, and a detector arrangement, a method includes the steps of directing the light beam through the first and second variable retarders and sweeping a selected one of the first and second retardance values progressively and unidirectionally through at least a part of the overall retardance range to produce a plurality of retardance values. The method further includes the steps of, for the plurality of retardance values, detecting at the detector arrangement at least a spatial portion of the beam and extracting the state of polarization based on the spatial portion of the light beam detected at the detector arrangement corresponding to the plurality of retardance values.

52 Claims, 8 Drawing Sheets

OTHER PUBLICATIONS

Kemp et al, A Photoelastic–Modulator Polarimeter at Pine Mountain Observatory, Aug. 1981, Publication of the Astrological Society of the Pacific, vol. 93, pp 521–525.

Oakberg, PEM–90 Application Note—Stokes Polarimetry, 1993, Hinds Instruments Website, www.hindspem.com/LIT/PDF/pem–90–sp.pdf.

Herke, Applications Notes—Response Time in Liquid–Crystal Variable Retarders, 1999, Meadowlark Optics Catalog and Web site, www.meadowlark.com/AppNotes/appnote4.htm.

Lu et al, Mueller Matrices and the Degree of Polarization, Jan. 15, 1998, Optics Communications, vol. 146, pp 11–14.

Lewis et al, Initial Operation of a Scanning Stokes Polarimeter, 1975, Solar Physics, vol. 45, pp 495–500.

Baur, Optical Polarimeters for Solar Research, 1981, Optical Engineering, vol. 20, No. 1, pp 002–013.

Baur et al, Stokes II—A New Polarimeter for Solar Observations, 1981, Solar Physics, vol. 70, pp 395–410.

* cited by examiner

RETARDANCE SWEEP POLARIMETER AND METHOD

BACKGROUND OF THE INVENTION

The present invention relates to polarimeters and, more specifically, to polarimeters based on liquid crystal variable retarders for determining the state of polarization of light incident thereon.

In applications ranging from astronomy to telecommunications, it is often desired to have knowledge of the state of polarization (SOP) of light. For example, astronomical applications include the utilization of polarization information of light received at a telescope as a tool for mapping solar magnetic fields. Chemical and pharmaceutical industries exploit the effect of enantiomerically enriched chiral compounds on the state of polarization for light passed through such compounds, i.e. optical activity. The state of polarization plays a significant role in telecommunications since polarization mode dispersion and polarization-dependent loss present considerable impediments to increased optical bandwidth. Furthermore, polarimetric measurements are used in a wide array of materials characterization, such as in quantification of thin film thickness and index and as a tool for mapping internal material strain via stress-induced birefringence.

The art and science of polarimetry is vast with a history that extends well over a century, and, accordingly, various mathematical descriptions of polarized light have long been established. For example, in the Stokes vector representation, the full SOP is characterized as a four element Stokes vector $\overline{S}$, which is defined as $$\overline{S} \equiv \begin{pmatrix} S_0 \\ S_1 \\ S_2 \\ S_3 \end{pmatrix} \quad (1)$$

where $S_0$=Total light intensity, $S_1$=Intensity difference between horizontal and vertical linearly polarized components, $S_2$=Intensity difference between ±45° linearly polarized components and $S_3$=Intensity difference between right and left circularly polarized components Other important and often utilized polarization parameters, such as the degree of polarization (DOP), degree of linear polarization (DOLP), degree of circular polarization (DOCP), ellipticity and orientation of major axis, are directly obtainable from the Stokes vector components. For example, $$DOP = \frac{\sqrt{S_1^2 + S_2^2 - S_3^2}}{S_0} \quad (2)$$

$$DOLP = \frac{\sqrt{S_1^2 + S_2^2}}{S_0} \quad (3)$$

$$DOCP = \frac{S_3}{S_0} \quad (4)$$

Turning now to the drawings, wherein like components are indicated by like reference numbers throughout the various figures where possible, attention is immediately directed to FIG. 1, which illustrates a Poincaré sphere 10. The Pioncaré sphere is a commonly used graphical visualization aid for the SOP. As shown in FIG. 1, a Poincaré sphere 10 represents a mapping of all possible SOPs onto the surface of a sphere. A north pole 12 and a south pole 14 of Poincaré sphere 10 correspond to right and left circularly polarized light, respectively. An equator 15 corresponds to linearly polarized light. Arbitrarily chosen opposing points 16 and 18 along the equator represent horizontal and vertical linear polarizations, and opposing points 20 and 22, which define a line orthogonal to the line defined by points 16 and 18, represent +45° and −45° linear polarizations, respectively. In terms of the Stokes vector of Eq. (1), the bottom three components of the Stokes vector define a three-dimensional vector that points from the center of the Poincaré sphere to a point on the surface of the sphere.

A Stokes polarimeter is a device for determining the SOP of light incident thereon by measuring the components of the Stokes vector of Eq. (1). In terms of the Poincaré sphere, the Stokes polarimeter determines the components of the Stokes vector by measuring the projections along the orthogonal axes of the Poincaré sphere. For example, passing the light through a horizontal linear polarizer is equivalent to measuring the projection of the Stokes vector along the horizontal axis. As another example, for measurements of circular polarization components, a quarterwave plate can be utilized to convert circular polarization components into a linear polarization, from which a linear polarizer may then be used to determine the projection. In general, multiple measurements must be made in order to obtain all four components of the Stokes vector.

Currently available polarimeter technologies use polarization optics to extract the polarization information of input light, which is received at one or more detectors and converted to electrical signals. There are mainly four types of existing polarimeters, the basic configurations of which are illustrated in FIGS. 2A–2D.

FIG. 2A illustrates a manually operated polarimeter 30 including an optical assembly 32 and a detector 39. Optical assembly 32 includes a casing 33, which contains passive optical elements (not shown) such as a polarizing element and an optical retarder. Casing 33 includes an opening 35 for accepting an input light 37 such that input light 37 is acted upon by the polarizing element and the optical retarder within optical assembly 32, and at least a portion of input light 37 is transmitted through optical assembly 32 to be detected by a detector 38. During normal operation, the user of polarimeter 30 manually rotates and flips optical assembly 32 to obtain data at detector 38. Optical assembly 32 is usually configured to have at least four measurement positions, and the data obtained at detector 38 is analyzed by a computer 39 to convert the four measurements into Stokes parameters. A device based on the design as shown in FIG. 2A is available from Optics for Research, for example, and such a design has been described in the literature.[1] A manually operated polarimeter such as polarimeter 30 is limited in that a relatively long time (i.e., several seconds) is required to take the full set of measurements. As a result, the calculated parameters are susceptible to inaccuracies due to power and polarization fluctuations in the input light. Also, since passive, static optical elements are used in the optical assembly, the wavelength range is limited due to the effective range of the optical elements.

Another prior art polarimeter is shown in FIG. 2B. A polarimeter 40 of FIG. 2B is a "division of aperture" or "division of amplitude" type polarimeter. Polarimeter 40 includes a beam expander 42, a collimator 43, a Stokes filter array 45, which includes at least four filters 46, and a detector array 47, in which a plurality of detectors 48 are aranged to detect light transmitted through each of filters 46. Input light 37 is expanded by beam expander 42 then collimated by collimator 43 to be incident on Stokes filter array 45. Each filter 46 is configured to be preferentially sensitive to different polarizations such that at least four simultaneous measurements may be taken to obtain the complete Stokes vector. Polarimeters based on the design shown in FIG. 2B are commercially available from companies such as A flash Corporation, Gaertner Scientific, Santec and General Photonics. Various modifications of polarimeter 40 are disclosed in the literature, such as the "photopolarimeter" which uses non-normal illumination of four detectors arranged in a non-planar configuration.[2] Polarimeter 40 is advantageous in comparison to polarimeter 30 of FIG. 2A due to the high speed in which data may be acquired, limited only by the detector speed. However, polarimeter 40 is still limited in the useful wavelength range due to the wavelength-dependence of the Stokes filters, and the need for a plurality of balanced detectors adds to the total cost of the system. Also, polarimeter 40 is extremely sensitive to the angle of incidence of the input light. In order to overcome this incidence angle sensitivity, other researchers have suggested various configurations in which light propagation into the polarimeter is confined by the use of optical fibers.[3-9] Yet, the use of fibers adds to the complexity and cost of the polarimeter while further limiting useful optical bandwidth, and therefore is not desirable in many applications.

A third type of polarimeter is shown in FIG. 2C. A polarimeter 50 includes first and second spinning retarders 52A and 52B, respectively, which spin in a direction indicated by curved arrows 53. Polarimeter 50 further includes an analyzer 54 and a detector 56. First and second spinning retarders 52A and 52B are configured to spin at different rate such that they modulate input light 37 at different rates, and detector 56 is configured to cooperate with first and second spinning retarders 52A and 52B to detect and demodulate the light received thereon by lock-in detection. The specific rate of spin, as well as the retardance values of the spinning retarders, are flexible, although certain retardance values will not work in the system (e.g., a one-wave retarder). Such polarimeters are commercially available from, for example, Thor Labs and are disclosed in a number of patents.[10-11] Tremendous accuracy (<0.001% error) has been achieved using the design shown in FIG. 2C.[12] This approach can be advantageous over the polarimeter design shown in FIG. 2A because the duty cycle for measurements is 100% (i.e., data is not just taken at four discrete steps but continuously while the retarders are spinning) and advantageous over both implementations shown in FIGS. 2A and 2B because rapid spin rates, coupled with lock-in detection, limit measurement bandwidth and transfer detection frequencies well above 1/f and other low frequency noise sources. Furthermore, polarimeter 50 requires only a single detector, which can lead to both cost savings and decreased angle of incidence sensitivity over multiple detector designs. However, the polarimeter design of FIG. 2C requires motors to spin the retarders, and the utilizable optical bandwidth is still limited due to the fixed retardance values of the spinning retarders.

A fourth type of polarimeter, as shown in FIG. 2D, is similar in configuration to polarimeter 50 as shown in FIG. 2C but the spinning passive retarders are replaced by stationary active or variable retarders. A polarimeter 60 includes first and second variable retarders 62A and 62B, respectively, with the orientation of optic axes of the two retarders being held fixed (thereby eliminating the need for motors or moving parts) while the retardance values of the two variable retarders are either switched between sets of specific, predetermined values, or rapidly modulated at different rates for the two different retarders.

In the case where the variable retarders are switched between specific, predetermined values, the retardance values of first and second variable retarders 62A and 62B are set to the predetermined values in a discrete, stepwise fashion, and an intensity measurement is taken at each of the predetermined values. The Stokes vector components are calculated based on the measurements taken at detector 56 at the predetermined values. One example of such a polarimeter based on the configuration shown in FIG. 2D and the step-wise measurement scheme is the LC Stokes polarimeter of Meadowlark Optics.[13] The LC Stokes polarimeter is configured to take a set of discrete measurements with the variable retarders set at discrete, predetermined retardance values in order to calculate the Stokes vector.

Continuing to refer to FIG. 2D in conjunction with FIG. 2C, polarimeter 60 has the added advantage of wavelength versatility since the retardance values of the variable retarders are not fixed and no moving parts are required, thereby simplifying the system design. The orientations of optical axes, represented by arrows 63A and 63B, of first and second variable retarders 62A and 62B, respectively, are typically chosen such that, for instance, optical axis 63A is vertical while optical axis 63B is positioned at an angle 65 away from the vertical. Small variations in angle 65 are usually accounted for in calibration process.

Referring now to FIG. 2E in conjunction with FIG. 2D, an example of a retardance value schematic for a stepwise polarimeter 50 is illustrated. This example is based on a prior publication regarding the LC Stokes polarimeter published by Meadowlark Optics.[13] A graph 70 of FIG. 2E includes a vertical axis 71 representing retardance (in units of waves $\lambda$) and a horizontal axis 72 representing time (in arbitrary units). A first, solid line 73 shows the retardance value settings of first variable retarder 62A, and a second, dashed line 75 shows the retardance value settings of second variable retarder 62B. Times $T_1$–$T_6$ are times at which measurements are taken in order to generate the data for extraction of the Stokes parameters. As shown in graph 70, first variable retarder 62A is first set to a retardance value of zero waves for the measurements taken at times $T_1$–$T_4$, then later held at a retardance value of $\lambda/4$ for the measurements taken at times $T_5$ and $T_6$. Second variable retarder 62B begins at zero wave retardance for time $T_1$, then is switched to a retardance value of $\lambda/2$ for a measurement at time $T_2$. Second variable retarder 62B is reset to a retardance value of $\lambda/4$ for a measurement at time $T_3$, and the second variable retarder is twice switched between retardance values of $\lambda/4$ and $3\lambda/4$ for measurements at times $T_3$–$T_6$. In this way, the first Stokes parameter $S_0$ of Eq. (1) is determined from any one set of two measurements (T1 and T2, T3 and T4, or T5 and T6), the $S_1$ component is found by comparing the detector readings obtained at times $T_1$ and $T_2$, the $S_3$-component is calculated by using the detector readings obtained at times $T_3$ and $T_4$, and the $S_2$ component is obtained by using the detector readings at times $T_5$ and $T_6$. In other words, the retardance values of the first and second variable retarders are set to predetermined values in a stepwise fashion, with discrete measurements being taken when the first and second variable retarders are fixed at predetermined retardance values for extraction of the Stokes parameters.

Although the Meadowlark LC Stokes polarimeter is sufficient for most applications, this device does have one disadvantage by a relatively slow acquisition time (>hundreds of milliseconds) due to the response times of the LC material and, since only single, discrete measurement are made, also a small measurement duty cycle. Also, it is not trivial to set the retardance values of the LC variable retarder at the exact, discrete values required for the step-wise Stokes parameter measurements.

As an alternative to the scheme shown in FIG. 2E, the retardance values of the two retarders of FIG. 2D may be rapidly oscillated such that the portion of input light 37 transmitted through first and second variable retarders 62A and 62B and analyzer 54 is detected at detector 56 by lock-in detection. The first and second variable retarders are modulated at first and second known frequencies, respectively, such that the polarization information of the input light can be obtained by analysis of the signal detected at the lock-in detector at the first and second known frequencies and their harmonics (usually twice the first and second known frequencies). The first and second variable retarders generally must be driven at different frequencies such that the resulting signals detected at the lock-in detector can be distinguished as being the result of the modulation by the first variable retarder or the second variable retarder. This scheme is analogous to the spinning waveplate technique, except with stationary variable retarders, the retardance of which are oscillated at predetermined frequencies. Various electro-optic and photoelastic materials may be used as the variable retarders.[14-16] For example, KDP or other electro-optic crystalline material is appropriate for use as the variable retarder in this scheme. Alternatively, piezo-electric elements can be used to stress optical fiber or a variety of bulk materials with sufficiently large stress-optical coefficients, such as calcium fluoride, lithium fluoride, or fused silica to induce birefringence. When driven at a resonant frequency, such photo-elastic modulators can obtain sufficient stroke for polarimetry applications. While both crystalline electro-optic and photo-elastic variable retarders are attractive due to their high modulation frequencies, they are expensive and require high voltage driving electronics as well as complex lock-in amplification and/or detection schemes. Liquid crystal materials may provide cost savings and simplified, low-voltage drive electronics, but are traditionally slow in comparison to KDP and electro-optic materials, therefore liquid crystals are generally not suited for use in the retardance oscillation polarimeters.

A sample measuring polarimeter generally measures the SOP of light that has been transmitted through or reflected from a sample. Numerous examples of sample measuring polarimeters exist in the literature. For instance, Oldenbourg et al. disclose a step-wise algorithm for obtaining polarization information from a sample using a polarized microscope including LC variable retarders.[17] The algorithm of Oldenbourg et al. sets the LC variable retarders at predetermined, discrete settings by applying a set of predetermined voltage values to the LC variable retarders. Intensity measurements of light transmitted through the LC variable retarders and the sample are taken at a detector, such as a CCD array. Then, the intensity values measured at the predetermined, discrete retardance values are inserted into an algorithm to calculate the retardance values at different portions of the sample. For example, the LC variable retarder of Oldenbourg et al. must be set to four different sets of applied voltages, and thereby retardance value, combinations in order to measure the retardance values of the sample specimen. It is noted that Oldenbourg et al. does not disclose or suggest in any way the measurement or calculation of Stokes parameters. Also, the disclosure of Oldenbourg et al. is limited to applications in a polarized light microscope.

The present invention provides a polarimeter and associated method which serves to reduce or eliminate the foregoing problems in a highly advantageous and heretofore unseen way and which provides still further advantages.

SUMMARY OF THE INVENTION

As will be disclosed in more detail hereinafter, there is disclosed herein a method for use in a polarimeter for analyzing a state of polarization of a light beam incident thereon. The polarimeter includes first and second variable retarders and a detector arrangement, wherein the first and second variable retarders are configured to exhibit first and second retardance values, respectively, which first and second retardance values are variable over an overall retardance range. The method includes the steps of directing the light beam through the first and second variable retarders, and sweeping a selected one of the first and second retardance values progressively and unidirectionally through at least a part of the overall retardance range. The method further includes the steps of, for a plurality of retardance values that are produced as the selected one of the first and second retardance values is progressively and unidirectionally swept through the part of the overall retardance range, detecting at the detector arrangement at least a spatial portion of the light beam, and extracting the state of polarization based on the spatial portion of the light beam detected at the detector arrangement corresponding to the plurality of retardance values.

In another aspect of the invention, there is disclosed a method for use in a polarimeter for analyzing a state of polarization of a light beam incident thereon. The polarimeter includes first and second liquid crystal variable retarders, a detector arrangement and a control arrangement, wherein the first and second liquid crystal variable retarders are configured to exhibit first and second retardance values, respectively, which first and second retardance values are variable over an overall retardance range. The control arrangement is configured to supply first and second voltage signals to the first and second liquid crystal variable retarders, respectively, so as to vary at least one of the first and second retardance values. The method includes the steps of directing the light beam through the first and second variable retarders, for a selected one of the first and second voltage signals, using the control arrangement, applying an initial voltage value so as to produce a particular condition at a corresponding one of the first and second liquid crystal variable retarders, and, once the particular condition is achieved, applying a different voltage value as the selected one of the first and second voltage signals for a given time period such that the corresponding one of the first and second retardance values varies progressively and unidirectionally during the given time period. The method further includes the steps of, during the given time period, detecting at the detector arrangement at least a spatial portion of the light beam responsive to the changing retardance, and extracting the state of polarization based on the spatial portion of the light beam detected at the detector arrangement.

In yet another aspect of the invention, there is disclosed a polarimeter for analyzing a state of polarization of a light beam incident thereon. The polarimeter of the present invention includes first and second variable retarders, wherein at least a selected one of the first and second variable retarders is configured to be progressively and unidirectionally variable through an overall retardance range so as to exhibit a plurality of retardance values. The polarimeter also includes a detector arrangement for detecting at least a spatial portion of the light beam for the plurality of retardance values as the selected one of the first and second variable retarders is progressively and unidirectionally varied through at least a part of the overall retardance range. The polarimeter further includes a control arrangement for causing the selected one of the first and second variable retarders to progressively and unidirectionally vary through the part of the overall retardance range and for extracting the state of polarization based on the spatial portion of the light beam detected at the detector arrangement.

In still another aspect of the invention, another polarimeter for analyzing a state of polarization of a light beam incident thereon is disclosed. The polarimeter of this aspect of the invention includes first and second liquid crystal variable retarders and a detector arrangement for detecting at least a portion of the light beam during a given time period. The polarimeter also includes a control arrangement configured to initially apply a first voltage signal then to apply, for the given time period, a second voltage signal to at least a selected one of the first and second liquid crystal variable retarders. The control arrangement is further configured to extract the state of polarization based on the spatial portion of the light beam detected at the detector arrangement.

In a further aspect of the invention, there is disclosed another method for use in a polarimeter for analyzing a state of polarization of a light beam incident thereon. The polarimeter includes first and second variable retarders and a detector arrangement for taking a measurement of at least a spatial portion of the light beam, wherein the first and second variable retarders are configured to exhibit first and second retardance values, respectively, which first and second retardance values are variable over an overall retardance range. The method includes the steps of directing the light beam through the first and second variable retarders, and varying a selected one of the first and second retardance values over a selected retardance interval. The method further includes the steps of using the detector arrangement to produce a plurality of measurements corresponding to a plurality of measurement points, which plurality of measurement points are incrementally spaced apart across the selected retardance interval, and extracting the state of polarization based on the plurality of measurements.

In a still further aspect of the invention, there is disclosed still another method for use in a polarimeter for analyzing a state of polarization of a light beam incident thereon. The polarimeter includes first and second variable retarders and a detector arrangement, wherein the first and second variable retarders are configured to exhibit first and second retardance values, respectively, which first and second retardance values are variable over an overall retardance range. The method includes the steps of calibrating the polarimeter using a plurality of test input light beams of known polarization states to derive a plurality of basis functions, directing the light beam through the first and second variable retarders, and sweeping a selected one of the first and second retardance values progressively and unidirectionally through at least a part of the overall retardance range. The method further includes the steps of, for a plurality of retardance values that are produced as the selected one of the first and second retardance values is progressively and unidirectionally swept through the part of the overall retardance range, detecting at the detector arrangement at least a portion of the input beam, and extracting the state of polarization by fitting a continuous function to the spatial portion of the light beam detected at the detector arrangement using the plurality of basis functions.

DESCRIPTION OF THE DRAWINGS

The present invention may be understood by reference to the following detailed description taken in conjunction with the drawings briefly described below.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the wildest scope consistent with the principles and features described herein.

Figure 3A:
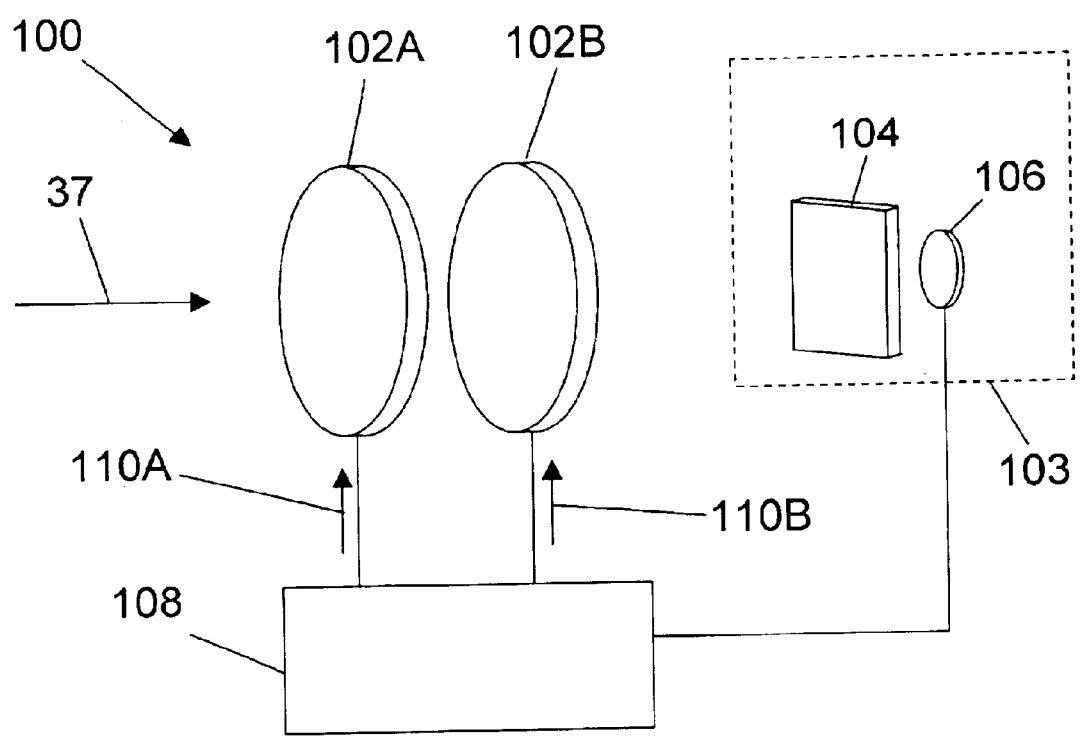
FIG. 3A is a diagrammatic illustration of a retardance sweep polarimeter of the present invention.

The configuration of a polarimeter manufactured in accordance with the present invention is shown in FIG. 3A. A polarimeter 100 includes first and second LC variable retarders 102A and 102B, respectively, and a detector arrangement (indicated by a box 103), which in the embodiment shown includes an analyzer 104 and a detector 106. Analyzer 104 may be, for example, a vertical linear polarizer such that any light that falls onto detector 106 is always of vertical linear polarization. For instance, first LC variable retarder 102A may be aligned with its optic axis (not shown) aligned with the optic axis (not shown) of analyzer 104, and second LC variable retarder 102B may, for example, be aligned with its optic axis (not shown) at a 45° angle with respect to the optic axes (not shown) of the first LC variable retarder and the analyzer. Polarimeter 100 also includes a controller 108, which controls first and second LC variable retarders 102A and 102B as well as detector 106. First and second LC variable retarders 102A and 102B may be based, for example, on a nematic liquid crystal material. Controller 108 is configured to apply voltage signals 110A and 110B to first and second LC variable retarders 102A and 102B, respectively, so as to control the retardance values of the LC variable retarders. Voltage signals 110A and 110B may be, for example, square wave AC voltage signals or DC signals, depending on the LC material used in the LC variable retarders. For example, AC voltage signals are appropriate for use with nematic LC materials. Controller 108 is also arranged such that, as input light 37 enters polarimeter 100, controller 108 synchronizes the signal detection process at detector 106 with the control of the retardance values at first and second LC variable retarders 102A and 102B in a predetermined way, as will be described in detail immediately hereinafter.

Figure 1:
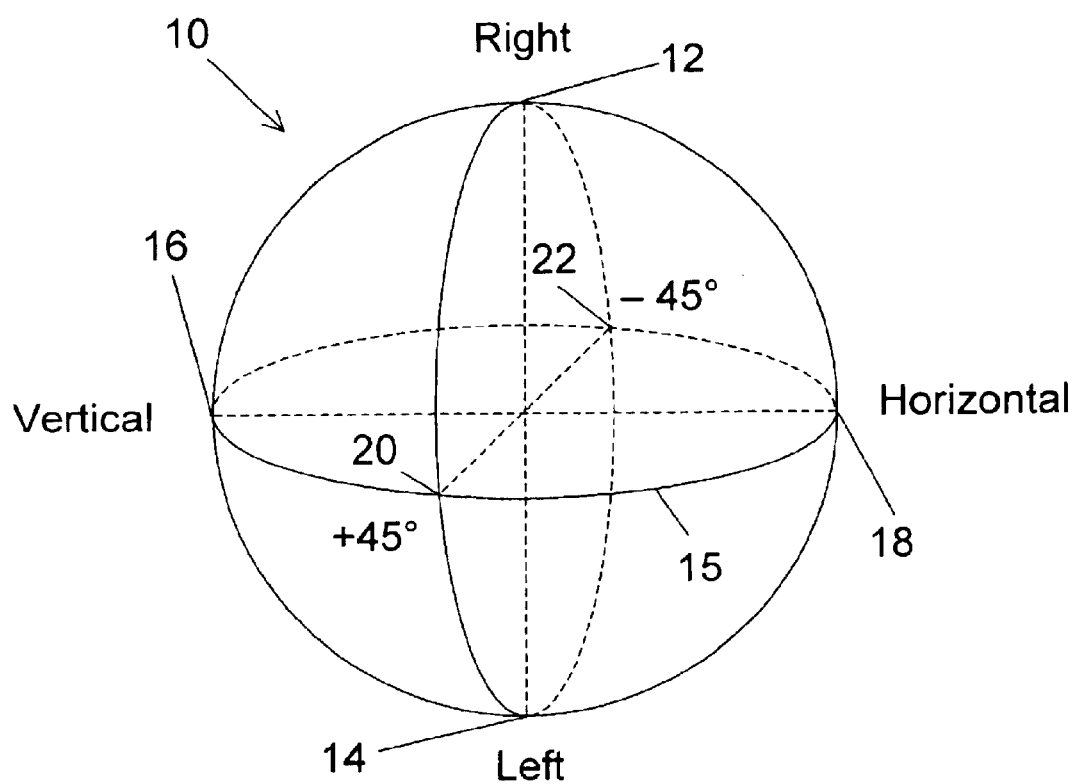
FIG. 1 is a diagrammatic illustration of a Poincaré sphere, shown here as a foundation for understanding the theoretical formalism of Stokes vector SOP characterization.
Figure 2A:
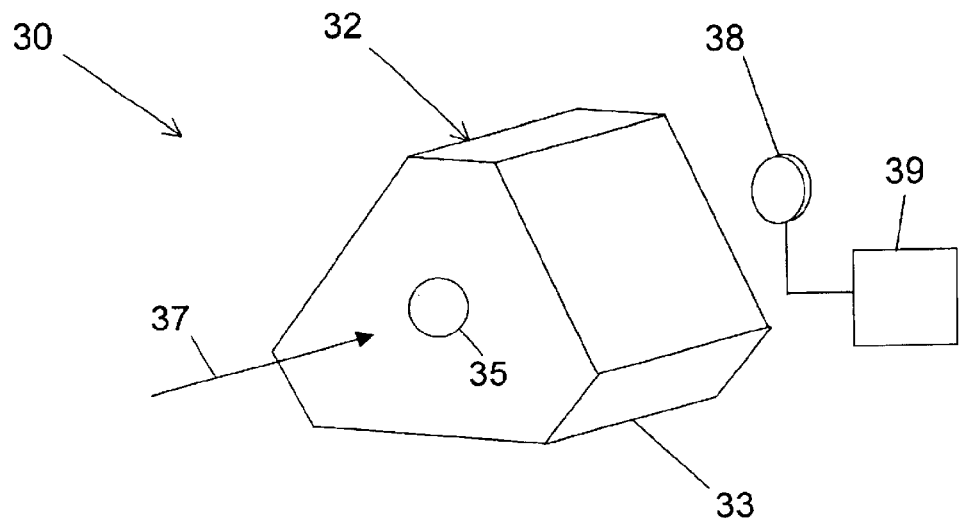
FIGS. 2A–2D are diagrammatic illustrations of some prior art polarimeters.
Figure 2B:
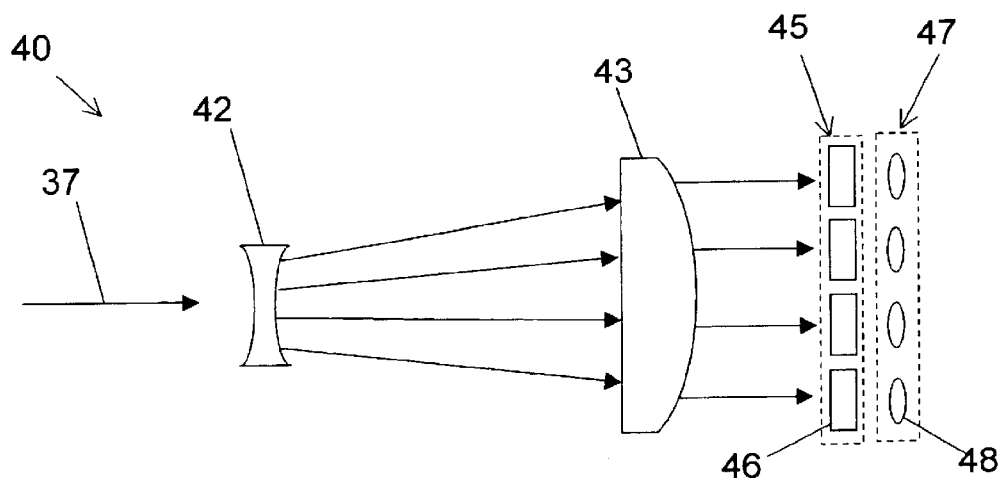
Figure 2C:
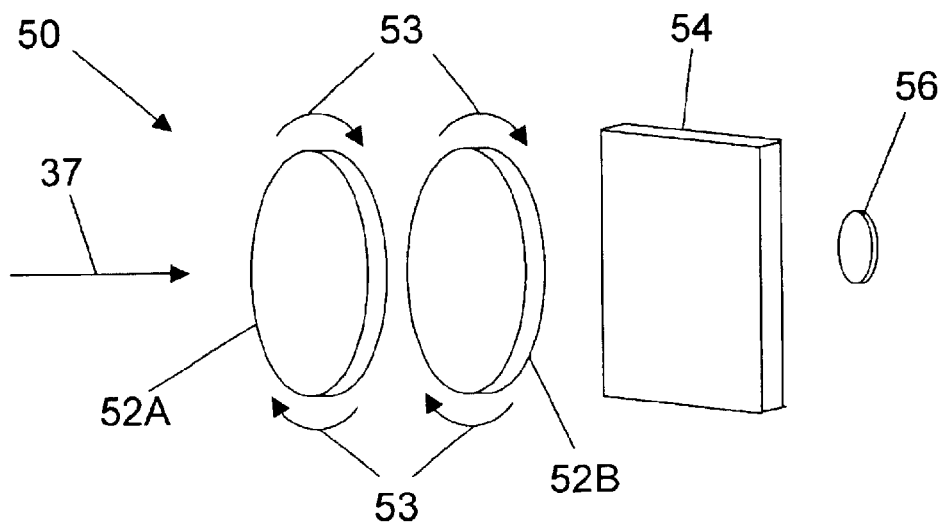
Figure 2D:
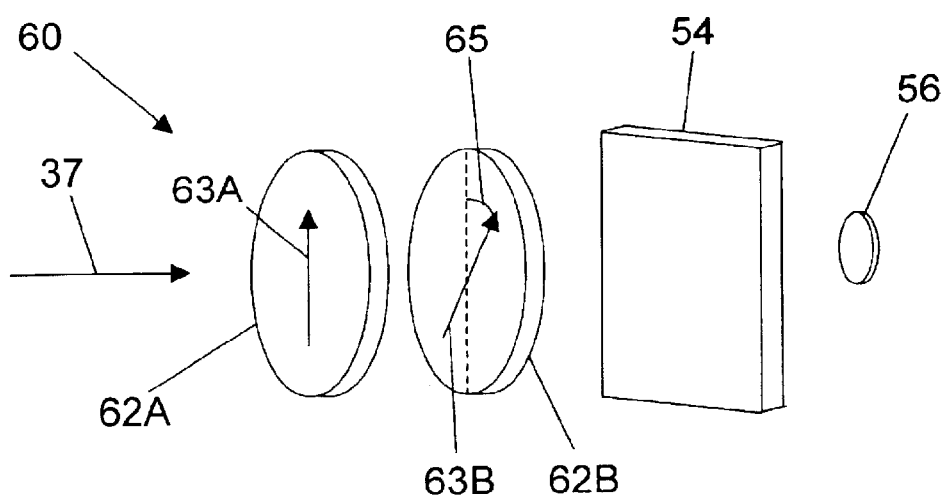
Figure 2E:
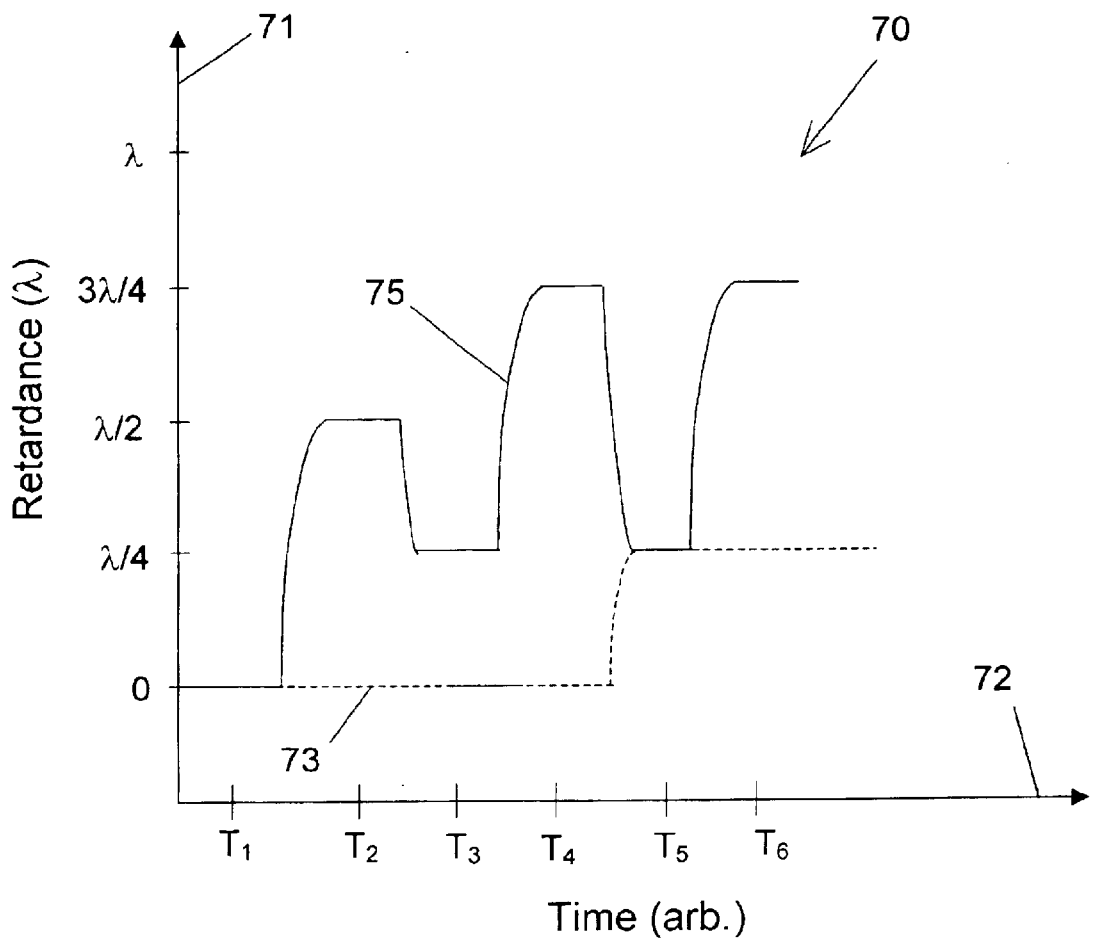
FIG. 2E is a graph of the retardance values versus time for one example of the prior art polarimeter including variable retarders as shown in FIG. 2D.

Controller 108 is configured to apply a set of predetermined voltage values to first and second LC variable retarders 102A and 102B such that LC variable retarders progressively and unidirectionally "sweep" through a range of retardance values. In other words, unlike previously known liquid crystal based polarimeters in which the retarders are stepped between specific, discrete retardance values as data are taken at each of these discrete retardance values (as shown in FIG. 2E), the retardance values of first and second LC variable retarders 102A and 102B of polarimeter 100 are progressively and unidirectionally varied while sampling of the signal at detector 106 is synchronized with the retardance sweeps to take a large number of measurements throughout the retardance sweeps. Therefore, polarimeter 100 manufactured in accordance with the present invention is referred to herein as a retardance sweep polarimeter. The details of such retardance "sweeping" is described in further detail immediately hereinafter.

Figure 3B:
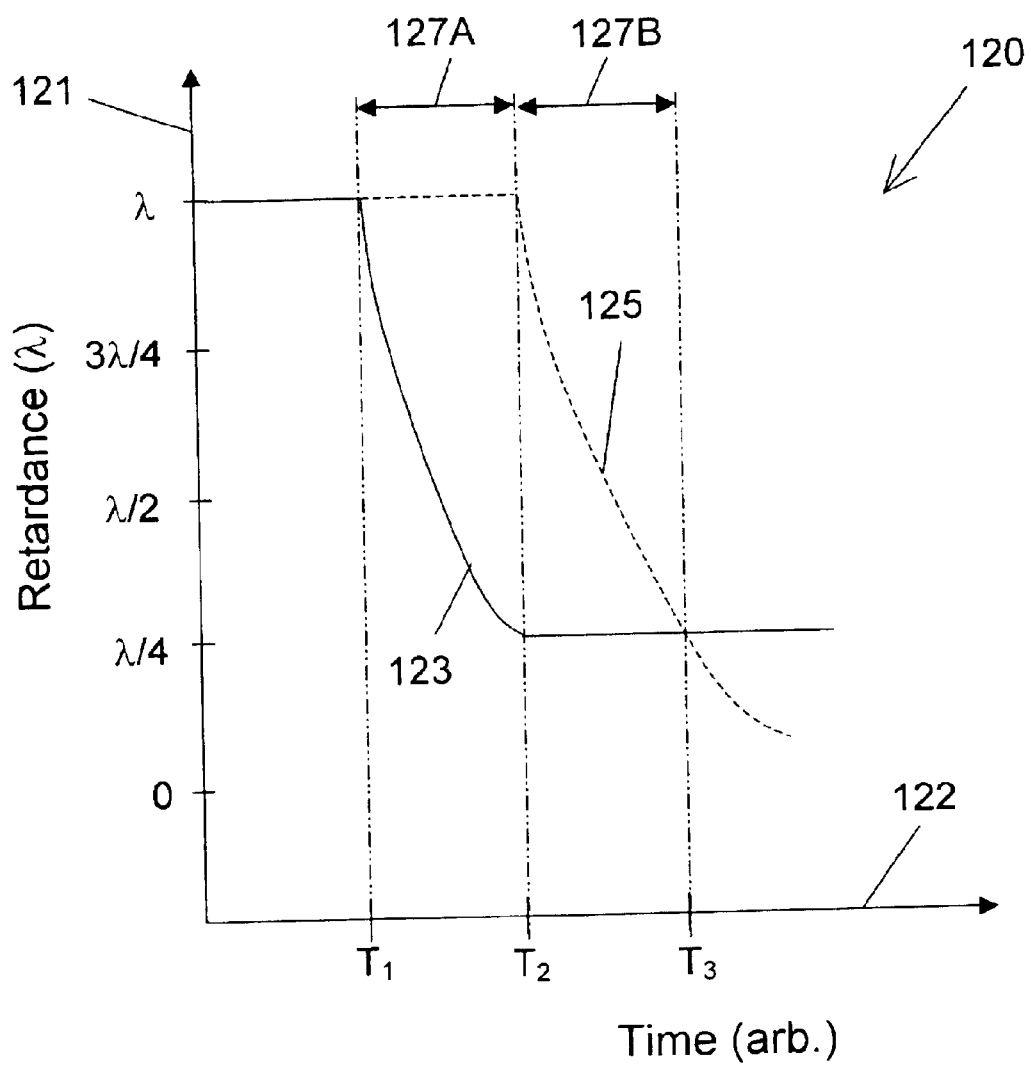
FIG. 3B is a graph of the retardance values versus time for one example of the retardance sweep polarimeter of the present invention.

Referring now to FIG. 3B in conjunction with FIG. 3A, an exemplary scheme of retardance values versus time for the LC variable retarders of the retardance sweep polarimeter of the present invention is illustrated. A graph 120 includes a vertical axis 121 representing retardance (in units of waves $\lambda$) and a horizontal axis 122 representing time (in arbitrary units). A first, solid line 123 shows the retardance value settings of first LC variable retarder 102A, and a second, dashed line 125 shows the retardance value settings of second LC variable retarder 102B. As can be seen in FIG. 3B, the first LC variable retarder is initially set to a retardance value of approximately $\lambda$, then, at a time $T_1$, the retardance value of the first LC variable retarder is made to fall (i.e., "sweep") until the retardance value reaches approximately $\lambda/4$ at a time $T_2$, from which time the retardance value of the first LC variable retarder is held at approximately $\lambda/4$. The reduction in retardance may be effected, for example, by the application of an increased voltage to first LC variable retarder 102A by controller 108. Similarly, the retardance value of the second LC variable retarder is held at an initial value of approximately $\lambda$ until time $T_2$, at which time the retardance value is made to fall past $\lambda/4$ at a time $T_3$. In other words, the first LC variable retarder sweeps the retardance range of $\lambda$ to $\lambda/4$ between times $T_1$ and $T_2$ while the second LC variable retarder is held at a retardance value of $\lambda$. Then, while the first LC variable retarder is held at a retardance value of $\lambda/4$, the second LC variable retarder is swept in retardance value over the range $\lambda$ to $\lambda/4$ between times $T_2$ and $T_3$. Therefore, a time period between times $T_1$ and $T_2$, indicated by a double headed arrow 127A, may be considered to be the time period for a retardance sweep #1, and a time period between times $T_2$ and $T_3$, indicated by a double headed arrow 127B, may be considered to be the time period for a retardance sweep #2. In the example shown in FIG. 3B, sweep #1 predominantly provides polarization information on the Stokes components $S_1$ and $S_3$, while sweep #2 predominantly provides information on component $S_2$.

It is noted that the retardance values shown in graph 120 are only approximate. In other words, the specific retardance values terminating these retardance value ranges for the first and second LC variable retarders need not be set with great accuracy in the polarimeter of the present invention in order to obtain the desired polarization information of input light because, as will be described hereinafter, the Stokes parameter information is extracted from a series of data sets including a plurality of measurements made during each sweep. It is not necessary to set the start and end retardance values to the approximate values of $\lambda$ and $\lambda/4$. In fact, an infinite variety of retardance value ranges are suitable for use in the present invention. The retardance sweeps are generally from higher to lower retardance values in the case of nematic LC material-based variable retarders since this direction corresponds to increasing applied voltage signals, to which the nematic LC material responds more quickly. Intensity profiles at detector 106 are recorded synchronously with the retardance sweeps then analyzed to extract the desired polarization information. The light intensity data collected at detector 106 is dependent on the state of polarization of input light 37; that is, each SOP will have a unique detector signature.

It is emphasized that the polarimeter of the present invention yields complete polarization information without the need for high frequency modulation of the variable retarders, high voltage driver electronics or lock-in amplifiers and/or detectors. Especially in contrast to the variable retarder oscillation and lock-in detection scheme discussed in the Background section, the polarimeter of the present invention requires only a progressive, unidirectional retardance sweep rather than repeated retardance oscillation. That is, the polarimeter of the present invention achieves fast, SOP measurements using low cost LC variable retarders and detection system in place of expensive electro-optic or photoelastic modulators with lock-in detection.

In order to minimize noise and error due to time-dependent shifts in input light polarization, it is desired to obtain this detector signature in as short a time as possible. For instance, it is possible to improve the response time of a variable retarder based on a nematic liquid crystal material by taking advantage of the transient nematic effect (TNE). TNE is a technique of overshooting a voltage change in order to increase the speed of the LC response. For example, to change a LC retarder from one retardance to a second retardance , rather than just changing the voltage to the steady-state value for the new retardance, the voltage change is temporarily greatly increased.[18] The polarimeter of the present invention takes advantage of the high speed obtainable with TNE and the versatility and low cost of LC materials. By taking advantage of TNE, it is possible to apply predetermined voltage signals from controller 108 so as to cause first and second LC variable retarders 102A and 102B to sweep through a range of retardance values very rapidly.

In order to understand the operation of polarimeter 100 as shown in FIG. 3A, the theory behind polarimeter 100 is described using Mueller matrix formulation.[19,20] As is well known, each optical component in an optical system may be represented as a 4×4 matrix called a Mueller matrix. Since the initial SOP of input light may be represented by an input Stokes vector, the SOP of input light after passing through the optical component is conveniently provided by an output Stokes vector resulting from multiplying the input Stokes vector by the Mueller matrix of the optical component. The Mueller matrices for some polarization optical components of interest are listed below:

Retarder, optic axis 0°, (5)

$$\text{retardance of } \delta: \begin{pmatrix} 1 & 0 & 0 & 0 \\ 0 & 1 & 0 & 0 \\ 0 & 0 & \cos(\delta) & \sin(\delta) \\ 0 & 0 & -\sin(\delta) & \cos(\delta) \end{pmatrix}$$

Retarder, optic axis 45°, (6)

$$\text{retardance of } \delta: \begin{pmatrix} 1 & 0 & 0 & 0 \\ 0 & \cos(\delta) & 0 & -\sin(\delta) \\ 0 & 0 & 1 & 0 \\ 0 & \sin(\delta) & 0 & \cos(\delta) \end{pmatrix}$$

Linear Polarizer, (7)

$$\text{optic axis } 0°: \begin{pmatrix} 1 & 1 & 0 & 0 \\ 1 & 1 & 0 & 0 \\ 0 & 0 & 0 & 0 \\ 0 & 0 & 0 & 0 \end{pmatrix}$$

Furthermore, an optical arrangement consisting of several optical components in series may itself be represented by a single Mueller matrix, which is constructed by multiplying the Mueller matrices for the optical components in the order in which input light encounters the components.

For an ideal, retardance sweep polarimeter (i.e., no loss, no noise, no misalignment, etc.) of FIG. 3A, the resulting Mueller matrix for the combination of first and second LC variable retarders 102A and 102B and analyzer 104 is Perfect LC Polarimeter: (8)

$$1/2 \begin{pmatrix} 1 & \cos(\delta 1) & \sin(\delta 1)\sin(\delta 2) & \cos(\delta 2)\sin(\delta 1) \\ 1 & \cos(\delta 1) & \sin(\delta 1)\sin(\delta 2) & \cos(\delta 2)\sin(\delta 1) \\ 0 & 0 & 0 & 0 \\ 0 & 0 & 0 & 0 \end{pmatrix},$$

which is obtained by matrix multiplication of the matrices in Eqs. (5)–(7). However, an ideal polarimeter is generally a mathematical abstract. For instance, the alignment of the optic axes of the LC variable retarders is rarely exactly 45° in actual devices, which would provide additional non-zero elements on the Mueller matrix of Eqs. (6). Furthermore, losses due to effects such as polarization scattering and retardance-dependent etalon effects (e.g., diattenuation) would require additional matrices not represented in Eqs. (5)–(6). Such non-ideal effects add to the complexity of the Mueller matrix for the polarimeter, but nevertheless a Mueller matrix for each real-life polarimeter does exist.

As will be further described, it is recognized in the context of the present invention that determination of the full, exact Mueller matrix for the non-ideal, real life polarimeter is not necessary to achieve a useful and accurate polarimeter. In the retardance sweep polarimeter of the present invention as shown in FIG. 3A, the retardance values of first and second LC variable retarders 102A and 102B are rapidly swept by application of the appropriate voltage from controller 108. It is further recognized that the actual retardance values of the first and second LC variable retarders are not required to accurately obtain polarization information regarding input light incident on the retardance sweep polarimeter, as will be discussed in further detail immediately hereinafter.

As shown in FIG. 3B, at the onset of each of retardance sweeps #1 and #2, the retardance of one LC variable retarder is caused to begin changing rapidly with applied voltage (and thereby time). Noting that there is a one-to-one correspondence between time and retardance after application of a predetermined voltage signal (e.g., a voltage step), the parameters in the following derivations are considered to be functions of time rather than retardance. It is notable that the following derivation may also be performed in terms of the measurement point index, i.e., the index number of the sampling points at which detector measurements are taken.

Considering first the intensity signal as detected at detector 106 of FIG. 3A, the light incident on the detector in this case is always of a known polarization due to the presence of analyzer 104. Therefore, the detector may be considered to provide an accurate measure of the first Stokes component (i.e., total light intensity) for the Stokes vector of light which has passed through the polarimeter. The relation may be expressed as $$\begin{pmatrix} S_0'(t) \\ -- \\ -- \\ -- \end{pmatrix} = \begin{pmatrix} a(t) & b(t) & c(t) & d(t) \\ -- & -- & -- & -- \\ -- & -- & -- & -- \\ -- & -- & -- & -- \end{pmatrix} \begin{pmatrix} S_0 \\ S_1 \\ S_2 \\ S_3 \end{pmatrix} \quad (9)$$

where a(t), b(t), c(t) and d(t)=time-dependent elements of the top row of the Mueller matrix for the polarimeter, $S_0'(t) = a(t)S_0 + b(t)S_1 + c(t)S_2 + d(t)S_3$ =intensity signal at detector, and $S_0, S_1, S_2, S_3$=Stokes parameters of the incident light.

The 4×4 matrix in Eq. (9) is the Mueller matrix for the non-ideal polarimeter, i.e., including manufacturing imperfections, misalignments, etc. The dashes in Eq. (9) represent vector and matrix elements which are not of concern because the retardance sweep polarimeter is not sensitive to those elements. Accordingly, it is desired to extract the elements in the top row of the retardance sweep polarimeter Mueller matrix as a function of time (to be described) for the retardance sweeps, i.e., the a(t), b(t), c(t) and d(t) functions. Then, once these functions are known, the detected waveform $S_0'(t)$ may be least squares fit with the unknown Stokes components $S_0$, $S_1$, $S_2$ and $S_3$ as floated parameters. The Stokes parameters $S_0$, $S_1$, $S_2$ and $S_3$ of the incident light are the desired polarization information.

It is notable that there exists an infinite number of measurement sets from which the Stokes vector projections may be extracted because a projection along any arbitrary axis of the Poincaré sphere is related to the projection along the desired axis through a transformation. The process of determining the transformation is equivalent to calibrating the polarimeter. Therefore, determining the a(t), b(t), c(t) and d(t) functions is the calibration process. The calibration is accomplished by application of a series of input light beams with known SOP and recording the signal detected at the detector. Determination of the four desired Mueller matrix elements a(t), b(t), c(t) and d(t) in Eq. (9) requires the application of four known polarizations and the subsequent recording of four intensity waveforms, which may be denoted P1, P2, P3 and P4. A convenient, but certainly not the only way to perform this process is to sequentially apply light of horizontal linear polarization, vertical linear polarization, +45° linear polarization and right circular polarization in succession while each time sweeping through the retardance values as described above in reference to FIG. 3B. By substituting the corresponding Stokes vectors for the known input polarization states into Eq. (9), the following relationships are obtained:

$$\begin{pmatrix} P1(t) \\ -- \\ -- \\ -- \end{pmatrix} = \begin{pmatrix} a(t) & b(t) & c(t) & d(t) \\ -- & -- & -- & -- \\ -- & -- & -- & -- \\ -- & -- & -- & -- \end{pmatrix} \begin{pmatrix} 1 \\ 1 \\ 0 \\ 0 \end{pmatrix} \rightarrow P1(t) = a(t) + b(t) \quad (10)$$

$$\begin{pmatrix} P2(t) \\ -- \\ -- \\ -- \end{pmatrix} = \begin{pmatrix} a(t) & b(t) & c(t) & d(t) \\ -- & -- & -- & -- \\ -- & -- & -- & -- \\ -- & -- & -- & -- \end{pmatrix} \begin{pmatrix} 1 \\ -1 \\ 0 \\ 0 \end{pmatrix} \rightarrow P2(t) = a(t) - b(t) \quad (11)$$

$$\begin{pmatrix} P3(t) \\ -- \\ -- \\ -- \end{pmatrix} = \begin{pmatrix} a(t) & b(t) & c(t) & d(t) \\ -- & -- & -- & -- \\ -- & -- & -- & -- \\ -- & -- & -- & -- \end{pmatrix} \begin{pmatrix} 1 \\ 0 \\ 1 \\ 0 \end{pmatrix} \rightarrow P3(t) = a(t) + c(t) \quad (12)$$

$$\begin{pmatrix} P4(t) \\ -- \\ -- \\ -- \end{pmatrix} = \begin{pmatrix} a(t) & b(t) & c(t) & d(t) \\ -- & -- & -- & -- \\ -- & -- & -- & -- \\ -- & -- & -- & -- \end{pmatrix} \begin{pmatrix} 1 \\ 0 \\ 0 \\ 1 \end{pmatrix} \rightarrow P4(t) = a(t) + c(t) \quad (13)$$

From Eqs. (10)–(13), it is straight forward to extract the desired a(t), b(t), c(t) and d(t) functions:

$$a(t)=P1(t)+P2(t)$$
$$b(t)=P1(t)-P2(t)$$
$$c(t)=P3(t)-a(t)$$
$$d(t)=P4(t)-a(t) \quad (14)$$

The aforedescribed calibration process results in four 1-D arrays for the functions a(t), b(t), c(t) and d(t), with the number of elements in the array being dependent upon the sweep duration and sampling speed. For example, typical sweep times in an exemplary polarimeter range from a few milliseconds up to tens of milliseconds, with typical array sizes of a hundred elements.

Figure 4A:
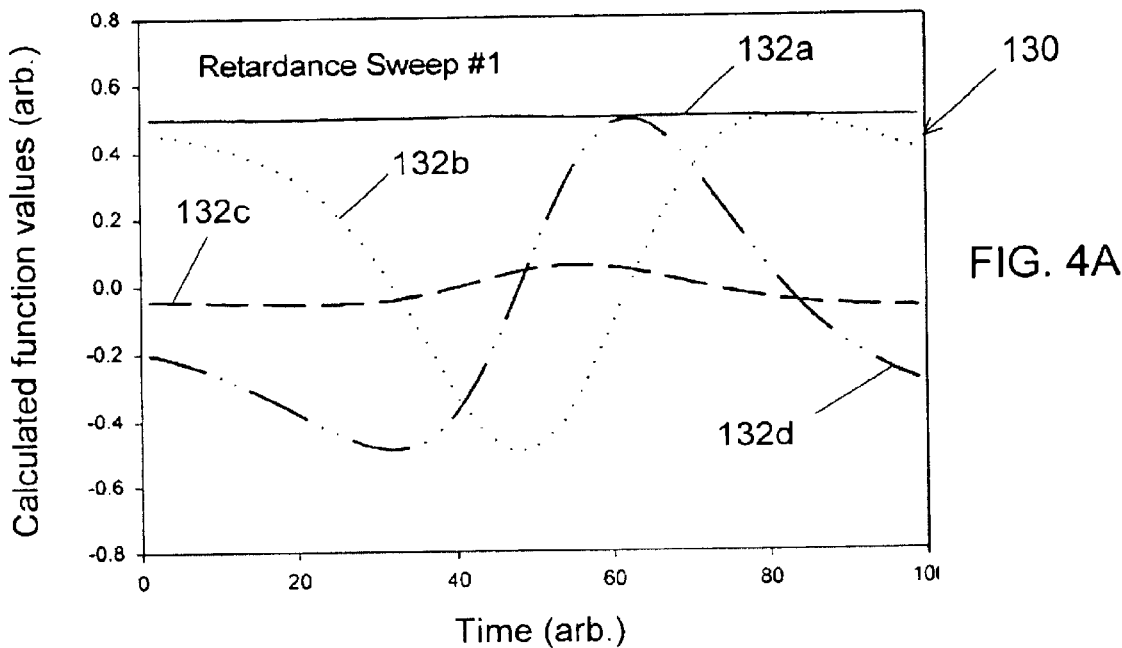
FIGS. 4A and 4B are graphs of the time-dependent basis functions calculated in a calibration process in accordance with the present invention.
Figure 4B:
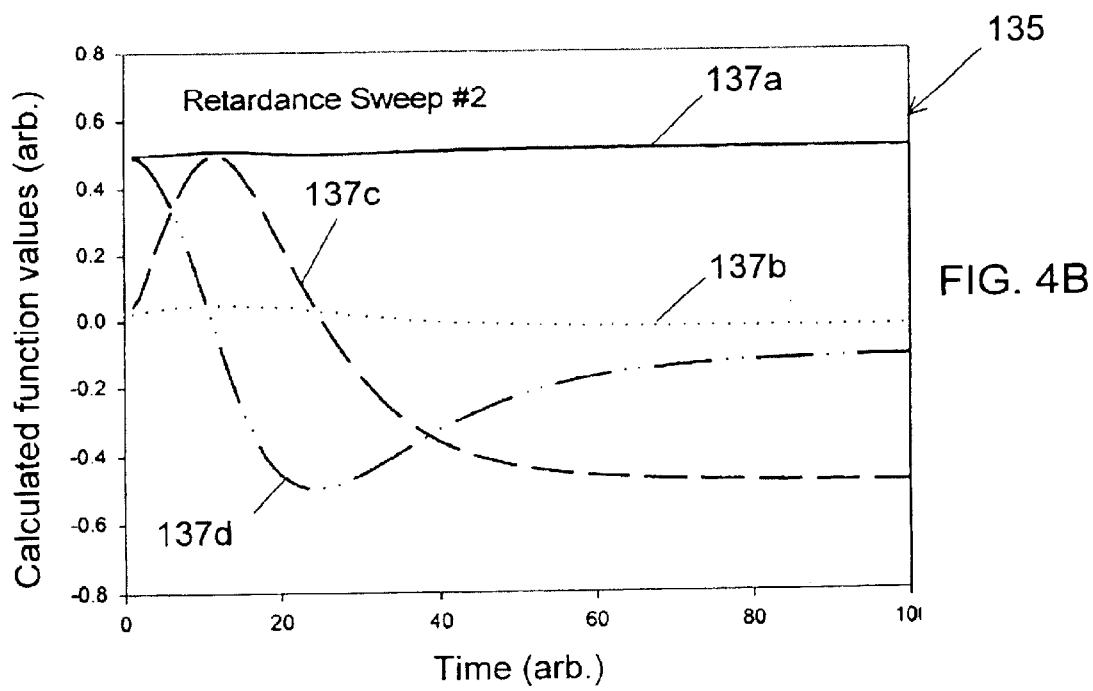

The a(t), b(t), c(t) and d(t) functions may be thought of as a set of basis functions such that the detected intensity profile $S_0'(t)=a(t)S_0+b(t)S_1+c(t)S_2+d(t)S_3$, which is transmitted through the polarimeter, is a linear combination of these basis functions with Stokes components $S_0$, $S_1$, $S_2$ and $S_3$ of the incident light as the weighting factors. Examples of calibration curves for the two retardance sweeps according to FIG. 3B are shown in FIGS. 4A and 4B. A graph 130, shown in FIG. 4A, includes the calculated values versus time for a(t) (a solid line 132a), b(t) (a dotted line 132b), c(t) (a dashed line 132c) and d(t) (a dot-dash combination line 132d) for the aforedescribed retardance sweep #1. Similarly, a graph 135 of FIG. 4B includes the calculated values versus time for a(t) (a solid line 137a), b(t) (a dotted line 137b), c(t) (a dashed line 137c) and d(t) (a dot-dash combination line 137d) for the aforedescribed retardance sweep #2. By using these functions a(t), b(t), c(t) and d(t) as basis functions, the Stokes parameters for any input light may be calculated by curve fitting. In this way, since any non-ideal characteristic of the polarimeter is absorbed in the calculation of the a(t), b(t), c(t) and d(t) functions, imperfections in the polarimeter system are accounted for (i.e., calibrated out) in the calculation of the SOP of incident light. For example, it is noted that the c(t) curve in FIG. 4A should be a straight horizontal line according to the Mueller matrix for the ideal polarimeter, Eq. (6), but the measured values of detected intensity are not constant due to the fact that the actual polarimeter on which these measurements were made is not an ideal device. By accounting for such deviations from theory in the calibration process, the SOP of the input light may be calculated with a high degree of accuracy.

Figure 5:
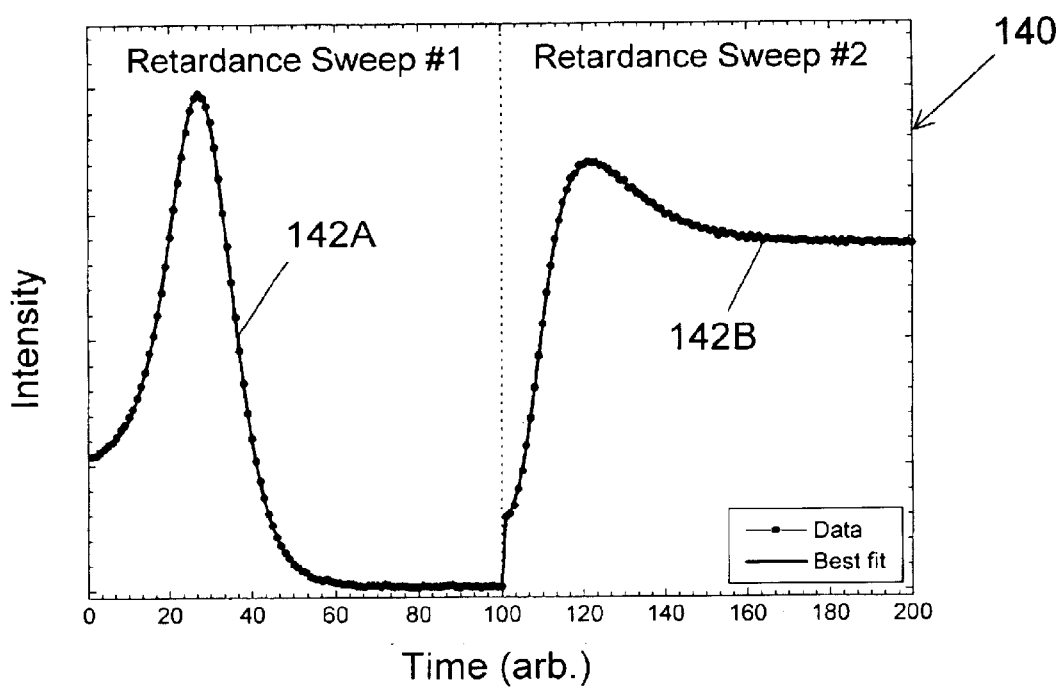
FIG. 5 is a graph of the data collected by the retardance sweep polarimeter of the present invention and the waveform consisting of a linear combination of the basis functions of FIGS. 4A and 4B.

Turning now to FIG. 5, an example of the extraction of the full SOP for an input light beam is shown performed using calibrated, polarimeter 100 as shown in FIG. 3A. A graph 140 of FIG. 5 includes a plurality of dots, representing the actual data taken, as well as curves 142A and 142B obtained by curve fitting the actual data during retardance sweeps #1 and #2, respectively. The best fit curves 142A and 142B are found using a least-squares fitting routine using a linear combination of the basis functions a(t), b(t), c(t) and d(t) as the model function, thereby fitting the two retardance sweeps simultaneously to find the Stokes parameters $S_0$, $S_1$, $S_2$ and $S_3$ for the incident light. The data, from which the Stokes vector is extracted, in the case shown in FIG. 5 is a 200 element long array. The use of the fitting routine effectively includes contributions from all 200 elements.

Continuing to refer to FIG. 5, it is emphasized that all of the plurality of data points collected during the retardance sweep procedure are utilized in the calculation of the SOP in the polarimeter of the present invention. This characteristic of the present invention is in contrast to, for example, the aforementioned step-wise approach of Oldenbourg et al., in which only four discrete data points are used to calculate the Stokes parameters. There is a significant signal-to-noise advantage to utilizing all of the data collected in the retardance sweeps rather than only four points. Furthermore, the speed enhancement achieved by the use of TNE allows the full data set from the retardance sweeps to be collected over an extremely short time frame of a few to up to tens of milliseconds. As a result, the retardance sweep polarimeter of the present invention is less susceptible to noise in comparison to prior art polarimeters, and measurement-to-measurement reproducibility error of less than 0.1% has been achieved, even with a largely fluctuating source (e.g., power fluctuations on the order of up to 20% over a time scale of tens of seconds).

Although each of the aforedescribed embodiments have been illustrated with various components having particular respective orientations, it should be understood that the present invention may take on a variety of specific configurations with the various components being located in a wide variety of positions and mutual orientations and still remain within the spirit and scope of the present invention. Furthermore, suitable equivalents may be used in place of or in addition to the various components, the function and use of such substitute or additional components being held to be familiar to those skilled in the art and arc therefore regarded as falling within the scope of the present invention. For example, although the aforedescribed example embodiment utilizes two sets of retardance sweeps to obtain the complete Stokes vector, it is also possible to calculate all of the Stokes vector components using a single sweep by using a simultaneous, concerted sweep of both retarders. The retarders may be synchronously swept at different rates in a manner analogous to the aforedescribed spinning waveplate approach, in which two passive waveplates are rotated at different rates. Proper timing of the synchronous sweeps would enable the extraction of full SOP data in a single set of measurements (rather than two sequential sweeps). Alternatively, the retardance sweeps of the two retarders may start and end at different times, with the sweeps partially overlapping during a certain time period, while light intensity data detected at the detector arrangement is recorded and analyzed to extract the polarization information. In other words, the retardance sweeps of the retarders need not be triggered simultaneously, as long as the sweeps are performed in a reproducible fashion so as to enable reproducible measurement and calibration. Another possible modification is the use of faster relaxation time liquid-crystal material. With a standard nematic LC, which can be switched quickly in one retardance sweep direction but not as quickly in the reverse sweep direction, thereby decreasing the duty cycle. Faster relaxation time, and thereby quick retardance sweeps in both directions, would increase the duty-cycle and, if the sweep times are fast enough, data could also be recorded in both sweep directions. Moreover, it would be possible to calibrate the retardance sweep polarimeter of the present invention over a certain range of wavelengths, then interpolate the calibration data to enable the measurement of SOP data at wavelengths away from the calibration range of wavelengths.

Therefore, the present examples are to be considered as illustrative and not restrictive, and the invention is not to be limited to the details given herein, but may be modified within the scope of the appended claims.

REFERENCES

1. J. M. Daniels, "Optimum design of a polarimeter for visible light," *Review of Scientific Instruments*, vol. 57, no. 8, 1986.
2. R. M. A. Azzam, "Arrangement of four photodetectors for measuring the state of polarization of light," *Optics Letters*, vol. 10, no. 7, 1985.
3. A. S. Siddiqui, "Optical polarimeter having four channels," U.S. Pat. No. 5,081,348, issued Jan. 14, 1992.
4. L. B. Allard et al., "Polarimeter," U.S. Pat. No. 6,043,887, issued Mar. 28, 2000.
5. E. Compain et al., "Polarimeter and corresponding measuring method," U.S. Pat. No. 6,177,995 B1, issued Jan. 23, 2001.
6. M. Abraham et al., "Micropolarimeter," U.S. Pat. No. 6,268,915 B1, issued Jul. 31, 2001.
7. T. Erdogan et al., "In-line all-fiber polarimeter," U.S. Pat. No. 6,211,957 B1, issued Apr. 3, 2001.
8. P. S. Westbrook, "System comprising in-line wavelength sensitive polarimeter," U.S. Pat. App. No. 2001/0038729 A1, Nov. 8, 2001.
9. L. B. Moellar et al., "Method and apparatus for polarization measurements," U.S. Pat. App. No. 2002/0044282 A1, Apr. 18, 2002.
10. D. H. Goldstein, "Infrared laser polarimeter," U.S. Pat. No. 5,247,176, issued Sep. 21, 1993.
11. R. M. A. Azzam, "Polarimeter," U.S. Pat. No. 4,306,809, issued Dec. 22, 1981.
12. A. Skumanich et al., "The calibration of the advanced Stokes polarimeter," *The Astrophysical Journal Supplement Series*, vol. 135, 1999.
13. "Stokes polarimetry using liquid-crystal variable retarders," Application Notes, Meadowlark Optics website (http:H/www.meadowlark.com/AppNotes/appnote3.htm).
14. T. Baur et al., "A spectrum scanning stokes polarimeter", *Solar Physics*, vol. 65, pp. 111, 1980.
15. J. C. Kemp et al., "A photolastic modulator polarimeter at Pine Mountain Observatory," *Publication of the Astronomical Society of the Pacific*, vol. 93, 1981.
16. "Strokes Polarimetry," PEM-90 Application Note, Hinds Instruments website (http://www.hindspem.com/LIT/PDF/pem-90-sp.pdf).
17. R. Oldenbourg et al., "Polarized light microscopy," U.S. Pat. No. 5,521,705, issued May 28, 1996.
18. "Response time in liquid-crystal variable retarders," Application Notes, Meadowlark Optics website (http:/www.mesdowlark.com/AppNotes/appnote4.htm).
19. W. A. Shurcliff, Polarized Light: *Production and Use*, Cambridge, Mass.: Harvard University Press, 1966.
20. S.-Y. Lu et al., "Mueller matrices and the degree of polarization," *Optics Communications*, vol. 146, 1997.

What is claimed is:

1. In a polarimeter for analyzing a state of polarization of a light beam incident thereon, said polarimeter including first and second variable retarders and a detector arrangement, wherein said first and second variable retarders are configured to exhibit first and second retardance values, respectively, which first and second retardance values are variable over an overall retardance range, a method comprising:

directing said light beam through said first and second variable retarders;

sweeping a selected one of said first and second retardance values progressively and unidirectionally through at least a part of said overall retardance range;

for a plurality of retardance values that are produced as the selected one of the first and second retardance values is progressively and unidirectionally swept through said part of the overall retardance range, detecting at said detector arrangement at least a spatial portion of said light beam; and extracting said state of polarization based on said spatial portion of said light beam detected at said detector arrangement corresponding to said plurality of retardance values.

2. The method of claim 1 wherein said detecting includes setting said spatial portion of said light beam to a chosen polarization state.

3. The method of claim 2 wherein said setting includes using a polarizer to polarize said spatial portion of said light beam to said chosen polarization state.

4. The method of claim 1 wherein said detecting includes establishing a plurality of measurement points in timed relation to one another during said sweeping.

5. The method of claim 4 wherein said establishing said plurality of measurement points includes setting said measurement points to be separated by an at least approximately equal interval in time.

6. The method of claim 4 wherein said detecting includes measuring an intensity value of said spatial portion of said light beam for each one of said plurality of measurement points so as to produce a plurality of measurements.

7. The method of claim 6 wherein said extracting includes fitting a continuous function to said plurality of measurements for said plurality of measurement points.

8. The method of claim 7 wherein said extracting includes calibrating said polarimeter using a plurality of test input light beams of known polarization states.

9. The method of claim 8 wherein said calibrating includes deriving a set of basis functions for use in said fitting.

10. The method of claim 7 wherein said extracting further includes selecting a sufficient number of measurement points to determine said continuous function to at least a predetermined approximation.

11. The method of claim 10 wherein said selecting includes choosing at least five measurement points.

12. The method of claim 1 wherein said polarimeter further includes a control arrangement configured to supply first and second voltage signals to said first and second variable retarders, respectively, and wherein said sweeping includes for a selected one of said first and second voltage signals corresponding to said selected one of said first and second retardance values, applying an initial voltage value using said control arrangement so as to produce a particular condition at a corresponding one of said first and second variable retarders, and once the particular condition is achieved, applying a different voltage value as the selected one of said first and second voltage signals for a given time period such that the corresponding one of said first and second retardance values varies progressively and unidirectionally during said given time period.

13. The method of claim 12 wherein said detecting is performed during said given time period.

14. In a polarimeter for analyzing a state of polarization of a light beam incident thereon, said polarimeter including first and second liquid crystal variable retarders, a detector arrangement and a control arrangement, wherein said first and second liquid crystal variable retarders are configured to exhibit first and second retardance values, respectively, which first and second retardance values are variable over an overall retardance range, and wherein said control arrangement is configured to supply first and second voltage signals to said first and second liquid crystal variable retarders, respectively, so as to vary at least one of the first and second retardance values, a method comprising:

directing said light beam through said first and second variable retarders;

for a selected one of said first and second voltage signals, using said control arrangement, applying an initial voltage value so as to produce a particular condition at a corresponding one of said first and second liquid crystal variable retarders;

once the particular condition is achieved, applying a different voltage value as the selected one of said first and second voltage signals for a given time period such that the corresponding one of said first and second retardance values varies progressively and unidirectionally during said given time period;

during said given time period, detecting at said detector arrangement at least a spatial portion of said light beam responsive to the changing retardance; and extracting said state of polarization based on said spatial portion of said light beam detected at said detector arrangement.

15. The method of claim 14 wherein said detecting includes setting said spatial portion of said light beam to a chosen polarization state.

16. The method of claim 15 wherein said setting includes using a polarizer as part of said detector arrangement to polarize said spatial portion of said light beam to said chosen polarization state.

17. A polarimeter for analyzing a state of polarization of a light beam incident thereon, said polarimeter comprising:

first and second variable retarders, wherein at least a selected one of said first and second variable retarders is configured to be progressively and unidirectionally variable through an overall retardance range so as to exhibit a plurality of retardance values;

a detector arrangement for detecting at least a spatial portion of said light beam for said plurality of retardance values as said selected one of said first and second variable retarders is progressively and unidirectionally varied through at least a part of the overall retardance range; and a control arrangement for causing the selected one of said first and second variable retarders to progressively and unidirectionally vary through said part of the overall retardance range and for extracting said state of polarization based on said spatial portion of said light beam detected at said detector arrangement.

18. The polarimeter of claim 17 wherein said detector arrangement includes a polarizer for setting said spatial portion of said light beam to a chosen polarization state.

19. The polarimeter of claim 17 wherein said first and second variable retarders include first and second optic axes, respectively, and wherein said first and second variable retarders are oriented such that said first and second optic axes form a 45° angle.

20. The polarimeter of claim 17 wherein said control arrangement is configured to supply first and second voltage signals to said first and second variable retarders, respectively, so as to vary at least one of the first and second retarders through said part of the overall retardance range.

21. The polarimeter of claim 20 wherein said control arrangement is further configured to apply an initial voltage value for a selected one of said first and second voltage signals corresponding to said selected one of said first and second variable retarders so as to produce a particular condition at said selected one of said first and second variable retarders, and wherein said control arrangement is still further configured to apply a different voltage value, once the particular condition is achieved, as the selected one of said first and second voltage signals for a given time period such that the corresponding one of said first and second variable retarders varies progressively and unidirectionally over at least a part of said overall retardance range during said given time period.

22. The polarimeter of claim 21 wherein said detector arrangement is configured to establish a plurality of measurement points during said given time period.

23. The polarimeter of claim 22 wherein said detector arrangement is further configured to set said measurement points to be separated by an at least approximately equal interval in time.

24. A polarimeter for analyzing a state of polarization of a light beam incident thereon, said polarimeter comprising:

first and second liquid crystal variable retarders;

a detector arrangement for detecting at least a spatial portion of said light beam during a given time period; and a control arrangement configured to initially apply a first voltage signal then to apply, for said given time period, a second voltage signal to at least a selected one of said first and second liquid crystal variable retarders, and to extract said state of polarization based on said spatial portion of said light beam detected at said detector arrangement.

25. The polarimeter of claim 24 wherein said detector arrangement includes a polarizer for setting said spatial portion of said light beam to a chosen polarization state.

26. The polarimeter of claim 24 wherein said first and second liquid crystal variable retarders include first and second optic axes, respectively, and wherein said first and second liquid crystal variable retarders are oriented such that said first and second optic axes form a 45° angle.

27. The polarimeter of claim 24 wherein said first and second liquid crystal variable retarders are configured to exhibit first and second retardance values, respectively, which first and second retardance values are variable over an overall retardance range, and wherein said second voltage signal is chosen such that a selected one of said first and second retardance values corresponding to said selected one of said first and second liquid crystal variable retarders varies progressively and unidirectionally over at least a part of said overall retardance range during said given time period due to the application of said second voltage signal.

28. The polarimeter of claim 27 wherein said detector arrangement is configured to establish a plurality of measurement points during said given time period.

29. The polarimeter of claim 28 wherein said detector arrangement is further configured to set said measurement points to be separated by an at least approximately equal interval in time.

30. In a polarimeter for analyzing a state of polarization of a light beam incident thereon, said polarimeter including first and second variable retarders and a detector arrangement for taking a measurement of at least a spatial portion of said light beam, wherein said first and second variable retarders are configured to exhibit first and second retardance values, respectively, which first and second retardance values are variable over an overall retardance range, a method comprising:
  directing said light beam through said first and second variable retarders;
  varying a selected one of said first and second retardance values over a selected retardance interval;
  using the detector arrangement to produce a plurality of measurements corresponding to a plurality of measurement points, which plurality of measurement points are incrementally spaced apart across said selected retardance interval; and
  extracting said state of polarization based on said plurality of measurements.

31. The method of claim 30 wherein said using the detector arrangement includes measuring an intensity value of said spatial portion of said light beam as one of said measurements for each one of said plurality of measurement points.

32. The method of claim 31 wherein said extracting includes fitting a continuous function to said measurements for said plurality of measurement points.

33. The method of claim 32 wherein said extracting includes calibrating said polarimeter using a plurality of test input light beams of known polarization states.

34. The method of claim 33 wherein said calibrating includes deriving a set of basis functions for use in said fitting.

35. The method of claim 32 wherein said extracting further includes selecting a sufficient number of measurement points to determine said continuous function to at least a predetermined approximation.

36. The method of claim 35 wherein said selecting includes choosing at least five measurement points.

37. The method of claim 30 wherein said using the detector arrangement includes setting said spatial portion of said light beam to a chosen polarization state.

38. The method of claim 30 wherein said using the detector arrangement includes establishing said plurality of measurement points in timed relation serially during said using.

39. The method of claim 38 wherein said establishing said plurality of measurement points includes setting said measurement points to be separated by an at least approximately equal interval in time.

40. The method of claim 30 wherein said varying includes sweeping said selected one of said first and second retardance values progressively and unidirectionally through said selected retardance interval.

41. The method of claim 40 wherein said polarimeter further includes a control arrangement, and wherein said varying includes supplying first and second voltage signals to said first and second variable retarders, respectively, using said control arrangement so as to vary at least one of the first and second retarders through said selected retardance interval.

42. The method of claim 41 wherein said supplying further includes applying an initial voltage value for a selected one of said first and second voltage signals corresponding to said selected one of said first and second variable retarders so as to produce a particular condition at said selected one of said first and second variable retarders, and, once the particular condition is achieved, applying a different voltage value as the selected one of said first and second voltage signals for said a time period such that the corresponding one of said first and second retardance values varies progressively and unidirectionally over said selected retardance interval during said given time period.

43. In a polarimeter for analyzing a state of polarization of a light beam incident thereon, said polarimeter including first and second variable retarders and a detector arrangement, wherein said first and second variable retarders are configured to exhibit first and second retardance values, respectively, which first and second retardance values are variable over an overall retardance range, a method comprising:
  calibrating said polarimeter using a plurality of test input light beams of known polarization states to derive a plurality of basis functions;
  directing said light beam through said first and second variable retarders;
  sweeping a selected one of said first and second retardance values progressively and unidirectionally through at least a part of said overall retardance range;
  for a plurality of retardance values that are produced as the selected one of the first and second retardance values is progressively and unidirectionally swept through said portion of said part of the overall retardance range, detecting at said detector arrangement at least a portion of said input beam; and
  extracting said state of polarization by fitting a continuous function to said spatial portion of said light beam detected at said detector arrangement using said plurality of basis functions.

44. The method of claim 43 wherein said calibrating includes
  directing each one of said plurality of test input light beams through said first and second variable retarders,
  for each one of said plurality of test input light beams, sweeping said selected one of said first and second retardance values progressively and unidirectionally through said part of said overall retardance range,
  for said plurality of retardance values that are produced as the selected one of the first and second retardance values is progressively and unidirectionally swept through said part of the overall retardance range, detecting at said detector arrangement at least a portion of each one of said test input light beams, and
  for each one of said plurality of test input light beams, generating one of said plurality of basis functions based on said portion of each one of said plurality of test input light beams.

45. A polarimeter for analyzing a state of polarization of an input light beam incident thereon, said polarimeter comprising:
  first and second variable retarders configured to receive said input light beam, wherein at least a selected one of said first and second variable retarders is configured to be progressively and unidirectionally variable through an overall retardance range so as to exhibit a plurality of retardance values;

a detector arrangement for detecting at least a portion of said input light beam for said plurality of retardance values as said selected one of said first and second variable retarders is progressively and unidirectionally varied through at least a part of said overall retardance range;

a light source arrangement for producing a plurality of test input beams of known polarization states; and a control arrangement for calibrating said polarimeter using said plurality of test input beams to derive a plurality of basis functions; for causing the selected one of said first and second variable retarders to progressively and unidirectionally vary through said part of said overall retardance range, and for extracting said state of polarization based on said portion of said input light beam detected at said detector arrangement.

46. The polarimeter of claim 45 wherein said light source arrangement is configured to direct each one of said plurality of test input beams through said first and second variable retarders, wherein said control arrangement is configured, for each one of said plurality of test input beams, to sweep said selected one of said first and second variable retarders progressively and unidirectionally through said part of said overall retardance range, wherein said detector arrangement is configured, for said plurality of retardance values exhibited by the selected one of said first and second variable retarders, to detect at said detector arrangement at least a portion of each one of said test input beams, and, wherein said control arrangement is further configured, for each one of said plurality of test input beams, to generate one of said plurality of basis functions based on said portion of each one of said plurality of test input beams.

47. In a polarimeter for analyzing a state of polarization of a light beam incident thereon, said polarimeter including fist and second variable retarders and a detector arrangement, wherein said first and second variable retarders are configured to exhibit first and second retardance values, respectively, which first and second retardance values are variable over an overall retardance range, a method comprising:

directing said light beam through said first and second variable retarders;

sweeping a selected one of said first and second retardance values progressively and unidirectionally through at least a part of said overall retardance range;

for a plurality of retardance values that are produced as the selected one of the first and second retardance values is progressively and unidirectionally swept through said part of the overall retardance range, detecting at said detector arrangement at least a spatial portion of said light beam, wherein said detecting includes
establishing a plurality of measurement points in timed relation to one another during said sweeping and
measuring an intensity value of said spatial portion of said light beam for each one of said plurality of measurement points so as to produce a plurality of measurements; and extracting said state of polarization based on said spatial portion of said light beam detected at said detector arrangement corresponding to said plurality of retardance values, wherein said extracting includes
fitting a continuous function to said plurality of measurements for said plurality of measurement points, and
calibrating said polarimeter using a plurality of test input light beams of known polarization states.

48. The method of claim 47 wherein said calibrating includes deriving a set of basis functions for use in said fitting.

49. In a polarimeter for analyzing a state of polarization of a light beam incident thereon, said polarimeter including first and second variable retarders and a detector arrangement, wherein said first and second variable retarders are configured to exhibit first and second retardance values, respectively, which first and second retardance values are variable over an overall retardance range, a method comprising:

directing said light beam through said first and second variable retarders;

sweeping a selected one of said first and second retardance values progressively and unidirectionally through at least a part of said overall retardance range;

for a plurality of retardance values that are produced as the selected one of the first and second retardance values is progressively and unidirectionally swept through said part of the overall retardance range, detecting at said detector arrangement at least a spatial portion of said light beam, said detecting including
establishing a plurality of measurement points in timed relation to one another during said sweeping, and
measuring an intensity value of said spatial portion of said light beam for each one of said plurality of measurement points so as to produce a plurality of measurements; and extracting said state of polarization based on said spatial portion of said light beam detected at said detector arrangement corresponding to said plurality of retardance values, wherein said extracting includes
fitting a continuous function to said plurality of measurements for said plurality of measurement points, and
selecting at least five measurement points to determine said continuous function to at least a predetermined approximation.

50. In a polarimeter for analyzing a state of polarization of a light beam incident thereon, said polarimeter including first and second variable retarders and a detector arrangement for taking a measurement of at least a spatial portion of said light beam, wherein said first and second variable retarders are configured to exhibit first and second retardance values, respectively, which first and second retardance values are variable over an overall retardance range, a method comprising:

directing said light beam through said first and second variable retarders;

varying a selected one of said first and second retardance values over a selected retardance interval;

using the detector arrangement to produce a plurality of measurements corresponding to a plurality of measurement points, which plurality of measurement points are incrementally spaced apart across said selected retardance interval, said using including
measuring an intensity value of said spatial portion of said light beam as one of said measurements for each one of said plurality of measurement points; and extracting said state of polarization based on said plurality of measurements, said extracting including fitting a continuous function to said measurements for said plurality of measurement points, and calibrating said polarimeter using a plurality of test input light beams of known polarization states.

51. The method of claim 50 wherein said calibrating includes deriving a set of basis functions for use in said fitting.

52. In a polarimeter for analyzing a state of polarization of a light beam incident thereon, said polarimeter including first and second variable retarders and a detector arrangement for taking a measurement of at least a spatial portion of said light beam, wherein said first and second variable retarders are configured to exhibit first and second retardance values, respectively, which first and second retardance values are variable over an overall retardance range, a method comprising:

directing said light beam through said first and second variable retarders;

varying a selected one of the first and second retardance values over a selected retardance interval;

using the detector arrangement to produce a plurality of measurements corresponding to a plurality of measurement points, which plurality of measurement points are incrementally spaced apart across said selected retardance interval, said using including measuring an intensity value of said spatial portion of said light beam as one of said measurements for each one of said plurality of measurement points; and extracting said state of pluralization based on said plurality of measurements, said extracting including fitting a continuous function to said measurements for said plurality of measurement points, and selecting at least five measurement points to determine said continuous function to at least a predetermined approximation.

\* \* \* \* \*